US010589705B2

(12) United States Patent
O'Connor et al.

(10) Patent No.: US 10,589,705 B2
(45) Date of Patent: Mar. 17, 2020

(54) RESTRAINT SYSTEM

(71) Applicant: Ford Global Technologies, LLC, Dearborn, MI (US)

(72) Inventors: Christopher Stephen O'Connor, Livonia, MI (US); Jacob Wookeun Lee, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 227 days.

(21) Appl. No.: 15/665,467

(22) Filed: Aug. 1, 2017

(65) Prior Publication Data
US 2019/0039549 A1    Feb. 7, 2019

(51) Int. Cl.
| B60R 21/16 | (2006.01) |
| B60R 21/015 | (2006.01) |
| B60R 21/233 | (2006.01) |
| B60R 21/239 | (2006.01) |
| B60R 21/263 | (2011.01) |
| B60R 21/20 | (2011.01) |
| B60R 21/30 | (2006.01) |
| B60R 21/231 | (2011.01) |
| B60R 21/00 | (2006.01) |

(52) U.S. Cl.
CPC ........ B60R 21/16 (2013.01); B60R 21/01512 (2014.10); B60R 21/01554 (2014.10); B60R 21/20 (2013.01); B60R 21/233 (2013.01); B60R 21/239 (2013.01); B60R 21/263 (2013.01); B60R 21/30 (2013.01); B60R 21/00 (2013.01); B60R 2021/2395 (2013.01); B60R 2021/23169 (2013.01); B60R 2021/2633 (2013.01)

(58) Field of Classification Search
CPC . B60R 21/205; B60R 21/2338; B60R 21/235; B60R 21/231; B60R 2021/23514; B60R 21/203; B60R 2021/23107; B60R 2021/23382; B60R 2021/23386
See application file for complete search history.

(56) References Cited

U.S. PATENT DOCUMENTS

| 5,209,510 | A | * | 5/1993 | Mamiya | B60R 21/205 |
| | | | | | 280/732 |
| 5,575,497 | A | * | 11/1996 | Suyama | B60R 21/231 |
| | | | | | 280/730.1 |
| 6,607,210 | B2 | * | 8/2003 | Eckert | B60R 21/233 |
| | | | | | 280/732 |
| 6,709,009 | B1 | * | 3/2004 | Michael | B60R 21/2171 |
| | | | | | 280/729 |
| 6,883,631 | B2 | * | 4/2005 | Hu | B60R 19/205 |
| | | | | | 180/274 |

(Continued)

FOREIGN PATENT DOCUMENTS

DE    10355764 B3    5/2005

*Primary Examiner* — Paul N Dickson
*Assistant Examiner* — Timothy Wilhelm
(74) *Attorney, Agent, or Firm* — Frank A. MacKenzie; Bejin Bieneman PLC

(57) ABSTRACT

A restraint system includes an instrument panel having an exterior panel directed downward, an airbag having an uninflated position behind the exterior panel and having a left chamber and a right chamber, a left inflator coupled to the left chamber, a right inflator coupled to the right chamber, and a controller programmed to selectively activate each inflator to one of a high output and a low output based on an impact angle.

20 Claims, 9 Drawing Sheets

(56) References Cited

U.S. PATENT DOCUMENTS

| | | | | |
|---|---|---|---|---|
| 6,942,242 B2* | 9/2005 | Hawthorn | B60R 21/16 | |
| | | | 280/728.2 | |
| 7,249,783 B2* | 7/2007 | Parkinson | B60R 21/217 | |
| | | | 280/736 | |
| 7,360,790 B2* | 4/2008 | Hasebe | B60R 21/233 | |
| | | | 280/743.2 | |
| 7,708,307 B2 | 5/2010 | Ida et al. | | |
| 7,731,230 B2* | 6/2010 | Fischer | B60R 21/205 | |
| | | | 280/728.1 | |
| 7,946,618 B2* | 5/2011 | Fukawatase | B60R 21/239 | |
| | | | 280/739 | |
| 8,038,169 B2* | 10/2011 | Rick | B60R 21/206 | |
| | | | 280/732 | |
| 8,376,396 B2* | 2/2013 | Miller | B60R 21/206 | |
| | | | 280/729 | |
| 8,463,500 B2* | 6/2013 | Cuddihy | B60R 21/0132 | |
| | | | 280/735 | |
| 8,500,165 B2* | 8/2013 | Kwon | B60R 21/239 | |
| | | | 280/738 | |
| 8,500,166 B2* | 8/2013 | Inuzuka | B23D 15/145 | |
| | | | 280/743.2 | |
| 8,646,808 B2* | 2/2014 | Williams | B60R 21/239 | |
| | | | 280/739 | |
| 8,882,138 B1* | 11/2014 | Hicken | B60R 21/231 | |
| | | | 280/730.1 | |
| 9,132,797 B2 | 9/2015 | Abramoski et al. | | |
| 9,150,186 B1* | 10/2015 | Belwafa | B60R 21/233 | |
| 9,187,055 B1* | 11/2015 | Genthikatti | B60R 21/2338 | |
| 9,205,798 B1* | 12/2015 | Jindal | B60R 21/16 | |
| 9,227,587 B1* | 1/2016 | Belwafa | B60R 21/205 | |
| 9,248,799 B2 | 2/2016 | Schneider et al. | | |
| 9,272,684 B1* | 3/2016 | Keyser | B60R 21/237 | |
| 9,283,911 B2* | 3/2016 | Nagasawa | B60R 21/015 | |
| 9,340,176 B2* | 5/2016 | Belwafa | B60R 21/233 | |
| 9,399,441 B2* | 7/2016 | Jaradi | B60R 21/0136 | |
| 9,446,735 B1* | 9/2016 | Jayasuriya | B60R 21/232 | |
| 9,499,118 B2* | 11/2016 | Jindal | B60R 21/231 | |
| 9,505,372 B2* | 11/2016 | Yamada | B60R 21/2338 | |
| 9,550,469 B2* | 1/2017 | Sato | B60R 21/233 | |
| 9,566,929 B1* | 2/2017 | Belwafa | B60R 21/205 | |
| 9,580,039 B2* | 2/2017 | Schneider | B60R 21/233 | |
| 9,731,677 B1* | 8/2017 | Belwafa | B60R 21/233 | |
| 9,738,243 B2* | 8/2017 | Fukawatase | B60R 21/2338 | |
| 9,758,121 B2* | 9/2017 | Paxton | B60R 21/205 | |
| 9,796,354 B1* | 10/2017 | Hayashi | B60R 21/239 | |
| 9,963,100 B2* | 5/2018 | Rao | B60R 21/01512 | |
| 10,011,243 B2* | 7/2018 | Patel | B60R 21/233 | |
| 10,040,416 B2* | 8/2018 | Fukawatase | B60R 21/231 | |
| 10,059,299 B2* | 8/2018 | Yamada | B60R 21/205 | |
| 2003/0218325 A1* | 11/2003 | Hasebe | B60R 21/233 | |
| | | | 280/743.2 | |
| 2006/0151228 A1* | 7/2006 | Kalliske | B60R 21/2338 | |
| | | | 180/274 | |
| 2008/0073893 A1* | 3/2008 | Schneider | B60R 21/2338 | |
| | | | 280/740 | |
| 2008/0122205 A1* | 5/2008 | Imamura | B60R 21/203 | |
| | | | 280/730.1 | |
| 2013/0147171 A1* | 6/2013 | Shin | B60R 21/2338 | |
| | | | 280/743.2 | |
| 2015/0166002 A1* | 6/2015 | Fukawatase | B60R 21/233 | |
| | | | 280/730.1 | |
| 2015/0175116 A1* | 6/2015 | Cho | B60R 21/205 | |
| | | | 280/729 | |
| 2015/0283971 A1* | 10/2015 | Fischer | B60R 21/2338 | |
| | | | 280/742 | |
| 2015/0343986 A1* | 12/2015 | Schneider | B60R 21/205 | |
| | | | 280/729 | |
| 2015/0367802 A1* | 12/2015 | Fukawatase | B60R 21/205 | |
| | | | 280/732 | |
| 2016/0046257 A1* | 2/2016 | Yamada | B60R 21/2338 | |
| | | | 280/729 | |
| 2016/0068131 A1* | 3/2016 | Komatsu | B60R 21/233 | |
| | | | 280/730.1 | |
| 2016/0159311 A1* | 6/2016 | Yamada | B60R 21/233 | |
| | | | 280/729 | |
| 2016/0159312 A1* | 6/2016 | Sato | B60R 21/233 | |
| | | | 280/729 | |
| 2016/0207490 A1* | 7/2016 | Yamada | B60R 21/2338 | |
| 2017/0101071 A1* | 4/2017 | Kruse | B60R 21/0136 | |
| 2017/0369019 A1* | 12/2017 | Jeong | B60R 21/2346 | |
| 2018/0029557 A1* | 2/2018 | Yamada | B60R 21/2338 | |
| 2018/0065581 A1* | 3/2018 | Ohno | B60R 21/01558 | |
| 2018/0154856 A1* | 6/2018 | Yamada | B60R 21/231 | |

* cited by examiner

RESTRAINT SYSTEM

BACKGROUND

Vehicles are subject to impact testing for different types of frontal collisions. As one example, Federal Motor Vehicle Safety Standard (FMVSS) 208 provides a test procedure designed to simulate a frontal collision into, e.g., a wall. The test procedure provides that a test vehicle holding a test dummy as an occupant collides in a forward direction at 35 miles per hour into a stationary rigid barrier perpendicular to the path of the test vehicle. FMVSS 208 sets forth requirements for various measures of injury to the test dummy, simulating potential injury to an occupant of the vehicle, such as head injury criterion (HIC), chest deflection, and femur load.

Another test simulates an impact to the test vehicle from another vehicle at an oblique angle. Specifically, the test procedure provides that a moving deformable barrier impacts the test vehicle with a speed of 56 miles per hour at an offset of 35% from a center of a front of the vehicle and at an angle of 15° from a vehicle-forward direction. This test has been proposed by the National Highway Traffic Safety Administration (NHTSA) for inclusion in the US New Car Assessment Program (US-NCAP). One measurement for this test is a brain injury criterion (BrIC). The BrIC is a function of the maximum pitch, roll, and yaw of a head of the test dummy during the test, specifically, $$BrIC = \sqrt{\left(\frac{\omega_{x\,max}}{66.3}\right)^2 + \left(\frac{\omega_{y\,max}}{53.8}\right)^2 + \left(\frac{\omega_{z\,max}}{41.5}\right)^2},$$

in which $\omega_{xmax}$ is the maximum roll velocity, $\omega_{ymax}$ is the maximum pitch velocity, and $\omega_{zmax}$ is the maximum yaw velocity, all measured in radians per second. Other possible measurements for this test include femur load, i.e., force imparted to a femur of the test dummy; and acetabulum load, i.e., force imparted to a hip socket of the test dummy.

DETAILED DESCRIPTION

Figure 1:
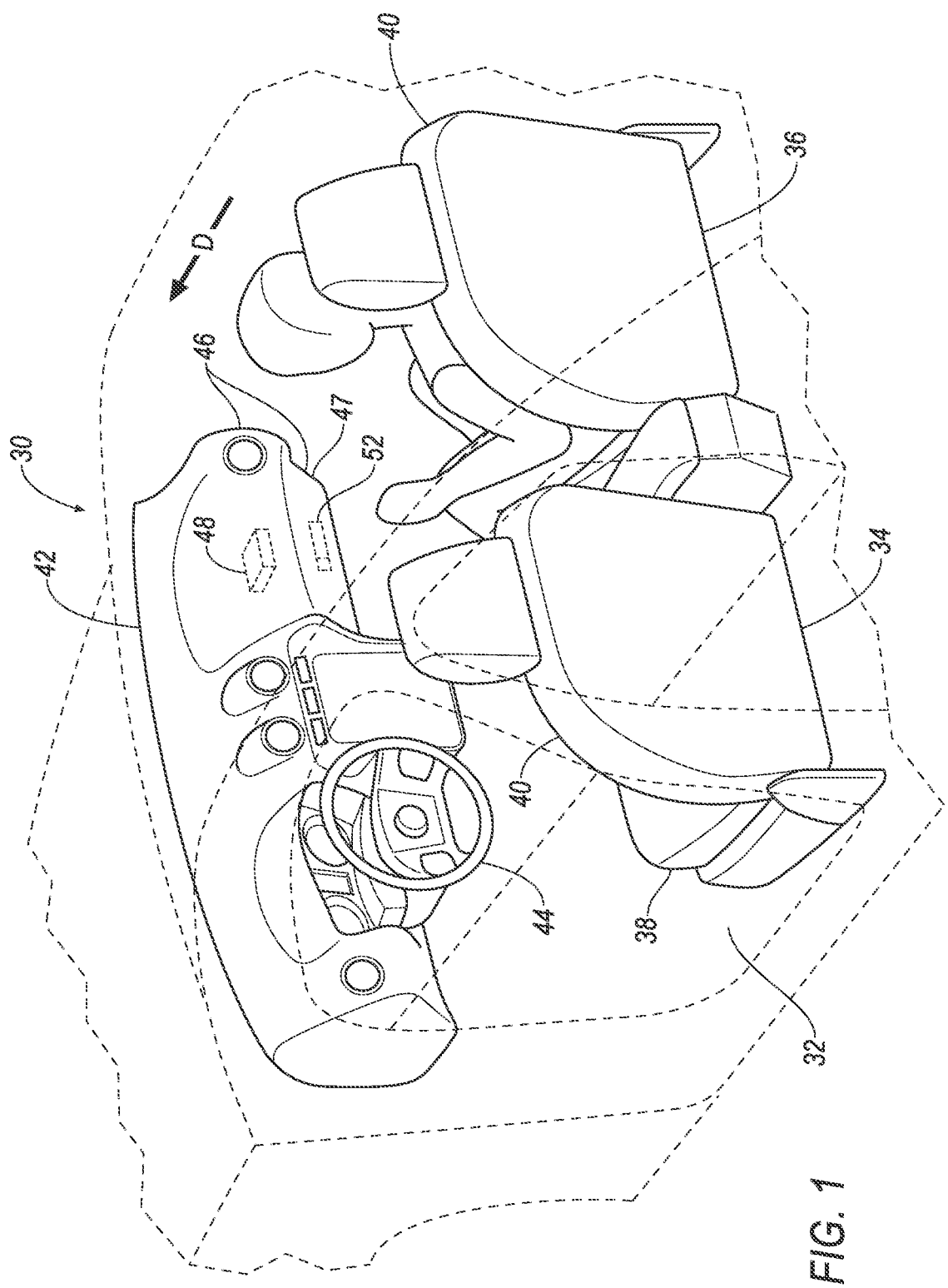
FIG. 1 is a perspective view of a passenger cabin in a vehicle.

A restraint system includes an instrument panel having an exterior panel directed downward, an airbag having an uninflated position behind the exterior panel and having a left chamber and a right chamber, a left inflator coupled to the left chamber, a right inflator coupled to the right chamber, and a controller programmed to selectively activate each inflator to one of a high output and a low output based on an impact angle.

The controller may be programmed to activate the left inflator to the high output in response to a left oblique impact and to activate the right inflator to the high output in response to a right oblique impact. The controller may be programmed to activate the right inflator to the low output in response to a left oblique impact and to activate the left inflator to the low output in response to a right oblique impact.

The controller may be programmed to receive a signal indicating lateral acceleration of a vehicle including the restraint system, and to activate both inflators at a low output in response to determining that an absolute value of the lateral acceleration is below an acceleration threshold. The acceleration threshold may be a first acceleration threshold, and the controller may be programmed to release the right tether in response to a left oblique impact upon determining that the lateral acceleration is above a second acceleration threshold, and to release the left tether in response to a right oblique impact upon determining that the lateral acceleration is above the second acceleration threshold. The second acceleration threshold may be greater than the first acceleration threshold.

The controller may be programmed to receive a signal indicating a position of a seat, and to retain the airbag in an uninflated position in response to determining that the seat is farther forward than a longitudinal threshold.

The restraint system may include a left vent in communication with the left chamber, a right vent in communication with the right chamber, a left tether coupled to the left vent and releasably coupled to the instrument panel, and a right tether coupled to the right vent and releasably coupled to the instrument panel. The vents may be active vents. The restraint system may include an airbag housing coupled to the instrument panel, and the airbag in the uninflated position may be disposed in the airbag housing. The restraint system may include a left release mechanism and a right release mechanism fixed relative to the airbag housing and in communication with the controller, and the left release mechanism may be positioned to release the left tether, and the right release mechanism may be positioned to release the right tether. The left release mechanism may be a left cutter positioned to sever the left tether, and the right release mechanism may be a right cutter positioned to sever the right tether. The left release mechanism may be a left release pin coupling the left tether to the airbag housing, and the right release mechanism may be a right release pin coupling the right tether to the airbag housing.

The restraint system may include an impact sensor in communication with the controller.

The airbag may include a dividing panel defining the left chamber and the right chamber.

The airbag may be disposed to inflate at least partially below the instrument panel.

The airbag may be positioned to contact knees of a 50th percentile occupant of a seat facing the instrument panel when the airbag is inflated.

The airbag is a first airbag, and the restraint system may include a second airbag coupled to the instrument panel above the first airbag.

The restraint system may reduce the brain injury criterion (BrIC) experienced by an occupant during an oblique impact to the vehicle. During an oblique impact, a head of an occupant may twist while impacting a passenger airbag. The controller instructs the inflators to inflate the chamber of the airbag closer to the side of the oblique impact more than the other chamber of the airbag. Pushing more on a knee of the occupant closer to the side of the impact may produce a twist on a body of the occupant tending to counteract the twist that may occur to the head of the occupant from the passenger airbag, which may reduce the maximum yaw velocity of the head of the occupant. The restraint system may be able to customize the force applied to the occupant's knees to reduce the load in cases when a higher load does not provide as much benefit; thus, the restraint system may also reduce the femur load and/or the acetabulum load experienced by the occupant.

With reference to FIG. 1, a vehicle 30 includes a passenger cabin 32 to house occupants, if any, of the vehicle 30. The vehicle 30 may be, for example, an automobile such as a car, truck, sport-utility vehicle (SUV), wagon, etc.

The passenger cabin 32 includes seats, which may include a front driver seat 34 and a front passenger seat 36 disposed at a front of the passenger cabin 32 and one or more back seats (not shown) disposed behind the front seats 34, 36. The passenger cabin 32 may also include third-row seats (not shown) at a rear of the passenger cabin 32. In FIG. 1, the front seats 34, 36 are shown to be bucket seats, but the front seats 34, 36 may be other types. Each of the front seats 34, 36 may include a seat bottom 38 and a seatback 40. The position and orientation of the front seats 34, 36 and components thereof may be adjustable by an occupant.

Figure 2:
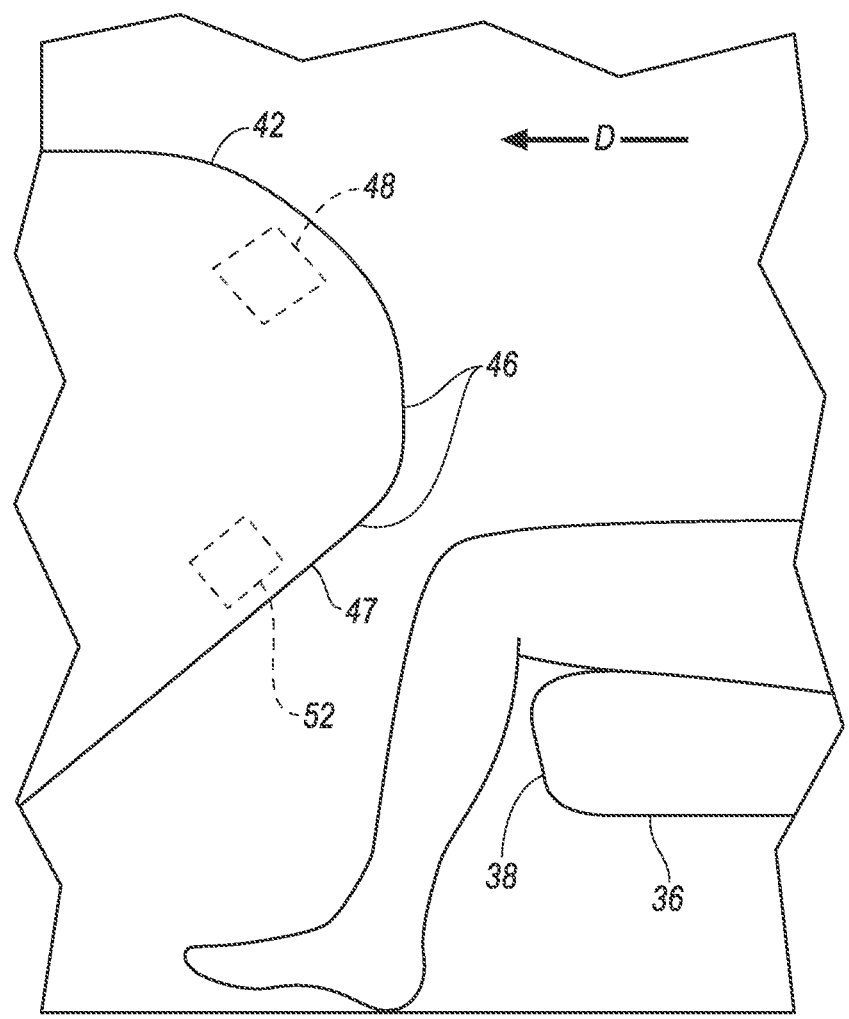
FIG. 2 is a side view of an instrument panel of the vehicle.
Figure 3:
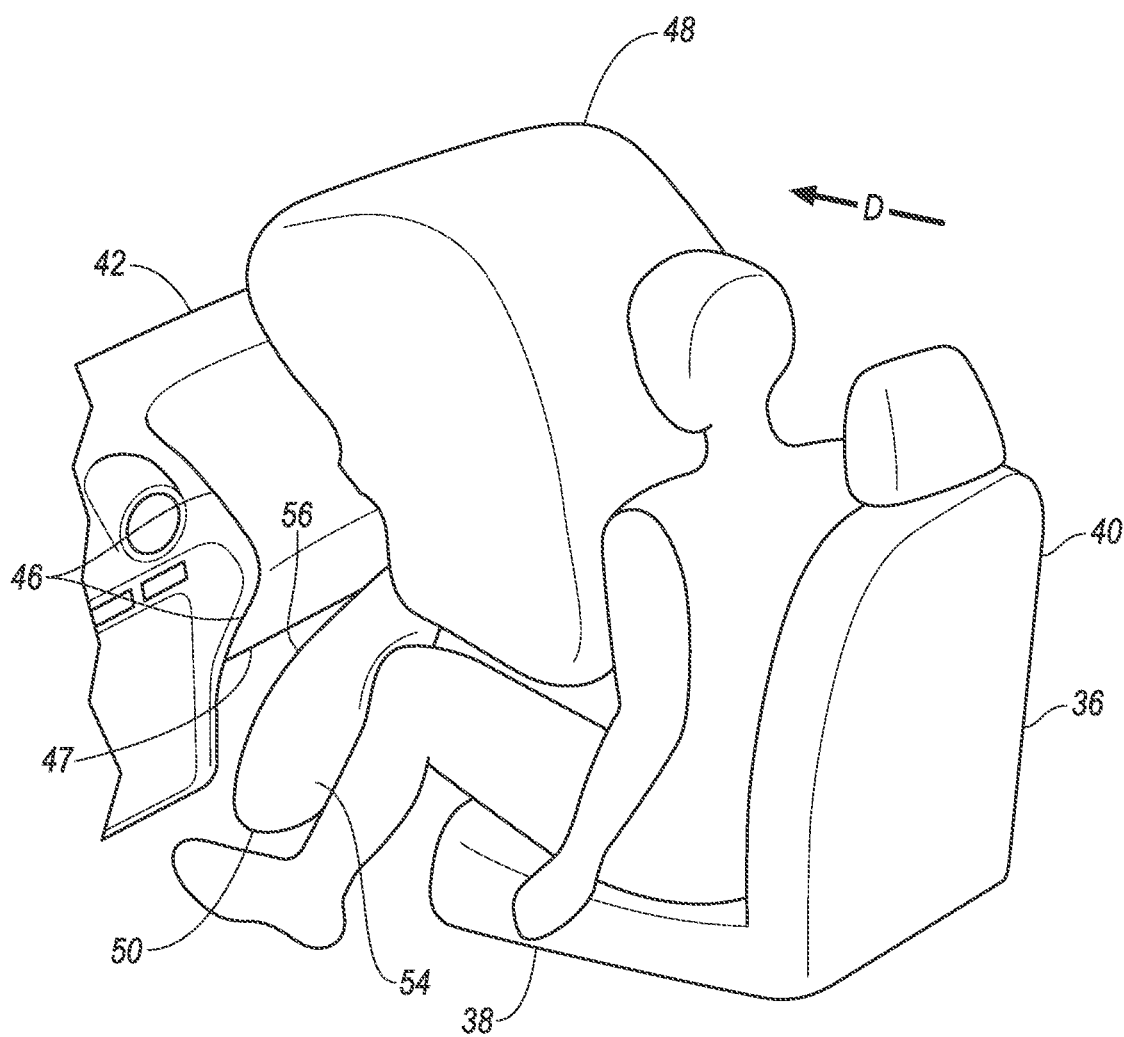
FIG. 3 is a perspective view of a portion of the passenger cabin with an airbag and a passenger airbag inflated.

With reference to FIGS. 1-3, an instrument panel 42 may be disposed at a forward end of the passenger cabin 32 and face toward the front seats 34, 36. The instrument panel 42 may include vehicle controls, such as a steering wheel 44; gauges, dials, and information displays; heating and ventilation equipment; a radio and other electronics; etc. The instrument panel 42 may be covered by exterior panels 46. The exterior panels 46 may be directed in various directions; for example, one or more of the exterior panels 46 on a top of the instrument panel 42 may be disposed upward and backward, i.e., toward a ceiling and toward the front seats 34, 36, and one or more of the exterior panels 46 on a bottom of the instrument panel 42 may be disposed downward and backward, i.e., toward a floor and toward the front seats 34, 36. The front seats 34, 36 may face the instrument panel 42. As one example, the exterior panels 46 include a downward-facing exterior panel 47. The downward-facing panel 47 is "directed downwardly," meaning that the downward-facing panel 47 faces at least partially downward, i.e., toward a floor of the passenger cabin 32. The downward-facing exterior panel 47 may be a single panel, may include multiple segments, and/or may include a portion of a segment.

A passenger airbag 48 may be inflatable from an uninflated position, as shown in FIGS. 1 and 2, to an inflated position, as shown in FIG. 3. In the uninflated position, the passenger airbag 48 may be disposed in the instrument panel 42 in front of the front passenger seat 36, that is, in a vehicle-forward direction D from the front passenger seat 36. The passenger airbag 48 may be coupled above a knee airbag 50. The passenger airbag 48 may be spaced from the steering wheel 44. The passenger airbag 48 may be disposed underneath an exterior panel 46 that is upward-facing. In the inflated position, the passenger airbag 48 may be disposed between a torso and/or head of an occupant of the front passenger seat 36 and the instrument panel 42.

With reference to FIGS. 1,2, and 5-8, an airbag housing 52 for the knee airbag 50 may be coupled to the instrument panel 42. For example, the airbag housing 52 may be fastened to the instrument panel 42. The airbag housing 52 may be disposed below the instrument panel 42, and may be disposed behind the downward-facing exterior panel 47 of the instrument panel 42. The airbag housing 52 may be aligned in the vehicle-forward direction D with the seat bottom 38 of the front passenger seat 36. The airbag housing 52 may extend partially around the knee airbag 50 when uninflated.

With reference to FIGS. 3-8, the knee airbag 50 is inflatable from an uninflated position, as shown in FIGS. 1 and 2, to an inflated position, as shown in FIGS. 3-8. The knee airbag 50 is coupled to the instrument panel 42, for example, via the airbag housing 52. The knee airbag 50 in the uninflated position may be disposed in the airbag housing 52 and behind the downward-facing exterior panel 47. The knee airbag 50 is disposed to inflate at least partially below the instrument panel 42, that is, in a vehicle-downward direction relative to the instrument panel 42. The knee airbag 50 in the inflated position is disposed in front of the seat bottom 38 of the front passenger seat 36. The knee airbag 50 may be positioned to contact knees of an occupant, e.g., a 50th percentile occupant, of the front passenger seat 36 when the airbag is inflated.

The knee airbag 50 may have an impact panel 54 and a forward panel 56 surrounding inflation chambers 58, 60. The impact panel 54 may face away from the instrument panel 42 when the knee airbag 50 is inflated, i.e., is in the inflated position. The impact panel 54 may face in a vehicle-rearward direction and/or a vehicle-downward direction when the knee airbag 50 is in the inflated position. The forward panel 56 may face toward the instrument panel 42 when the knee airbag 50 is inflated, i.e., is in the inflated position. The forward panel 56 may face in the vehicle-forward direction D and/or a vehicle-upward direction when the knee airbag 50 is in the inflated position. The impact panel 54 and the forward panel 56 may be approximately parallel to each other when the knee airbag 50 is in the inflated position. The impact panel 54 and the forward panel 56 may be connected by side panels 62. The side panels 62 may extend in vehicle-upward and vehicle-forward directions. The side panels 62 may be arranged on laterally opposite sides of the knee airbag 50.

Figure 4:
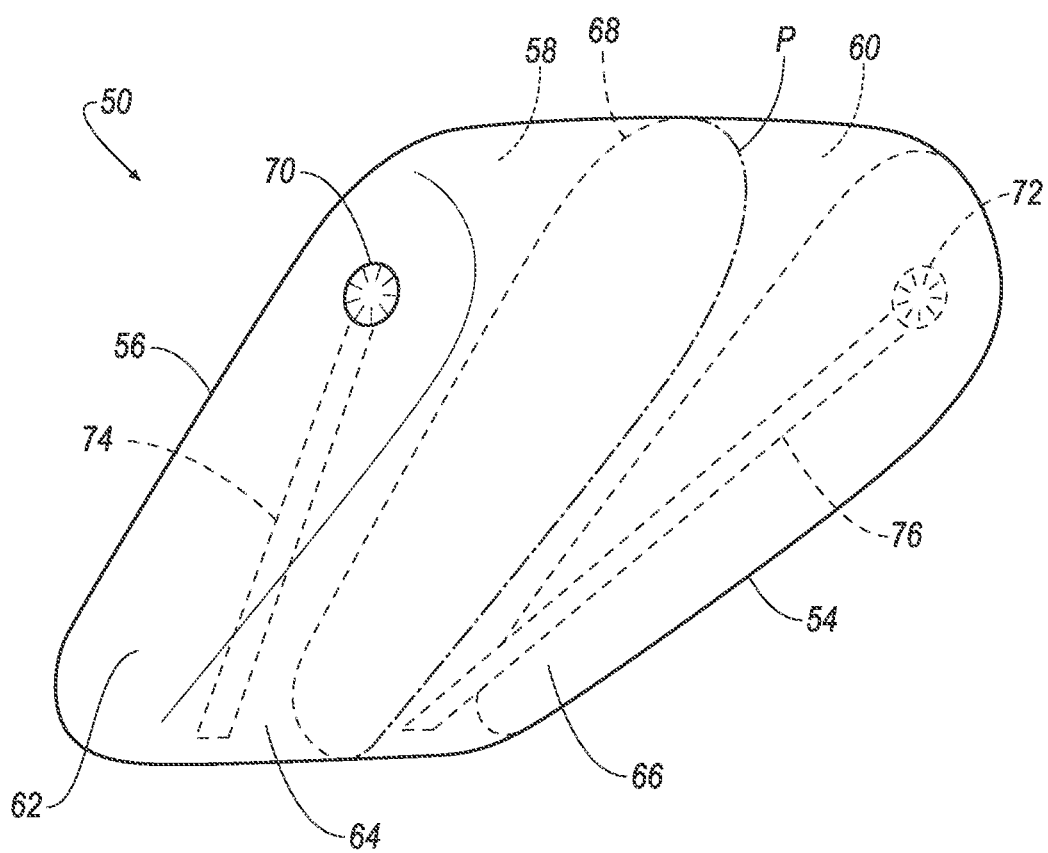
FIG. 4 is a perspective view of the airbag.
Figure 5:
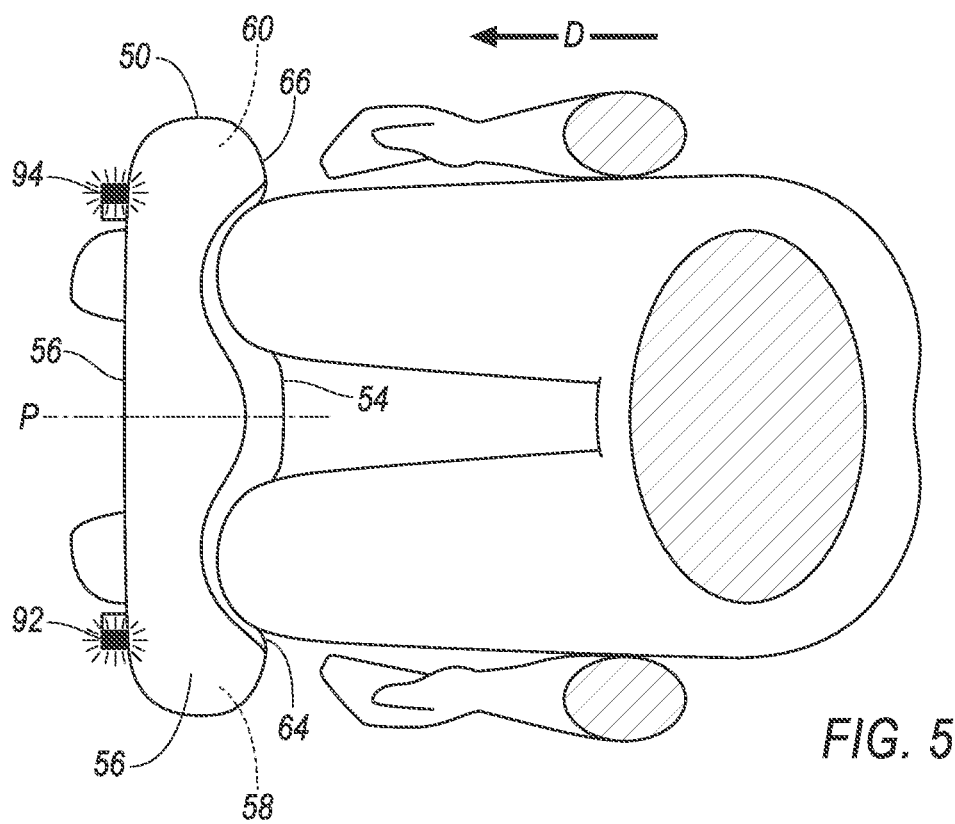
FIG. 5 is a top view of the airbag with two inflators activated at a low output.
Figure 6:
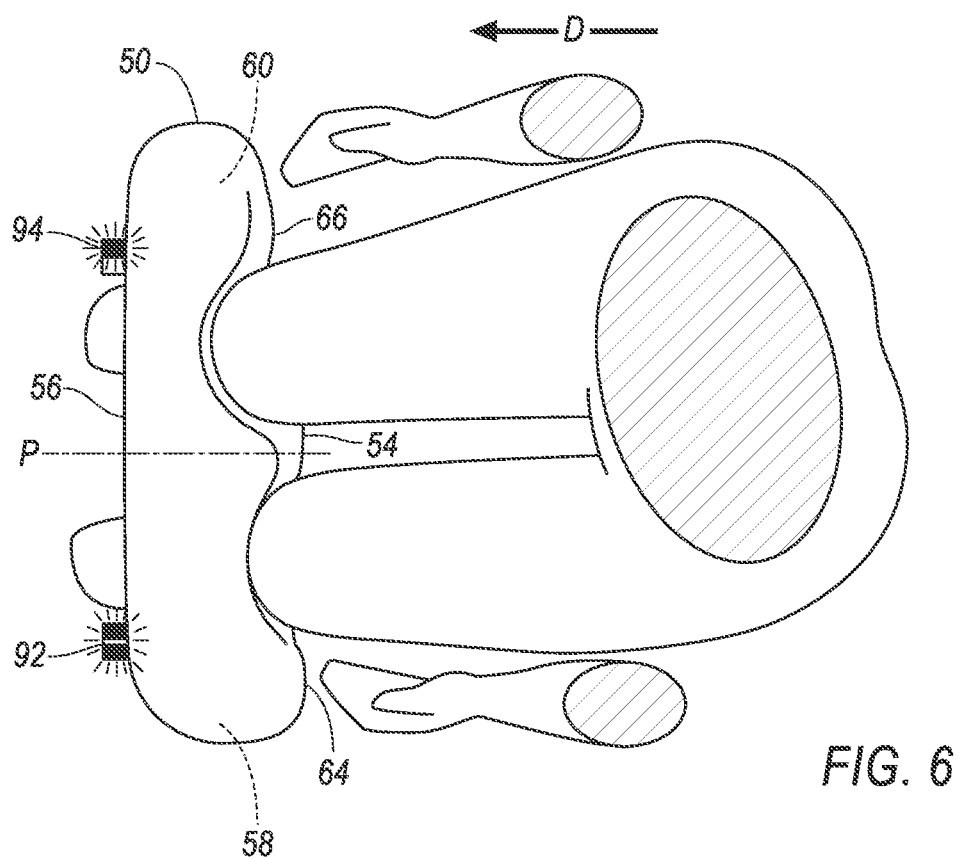
FIG. 6 is a top view of the airbag with one inflator activated at a high output and one inflator activated at a low output.
Figure 7:
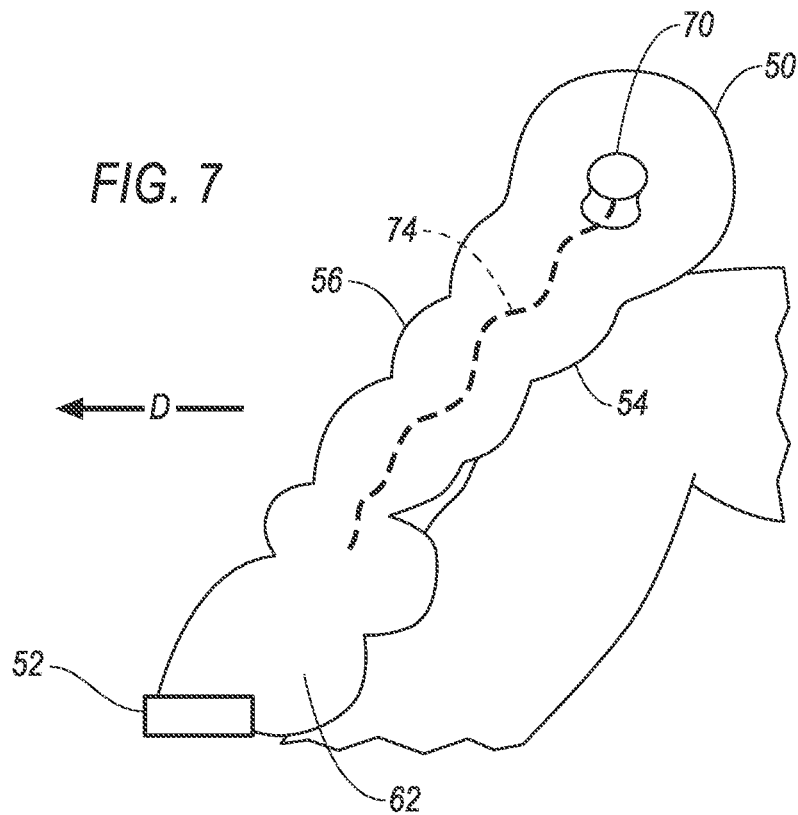
FIG. 7 is a side view of the airbag with a tether released.
Figure 8:
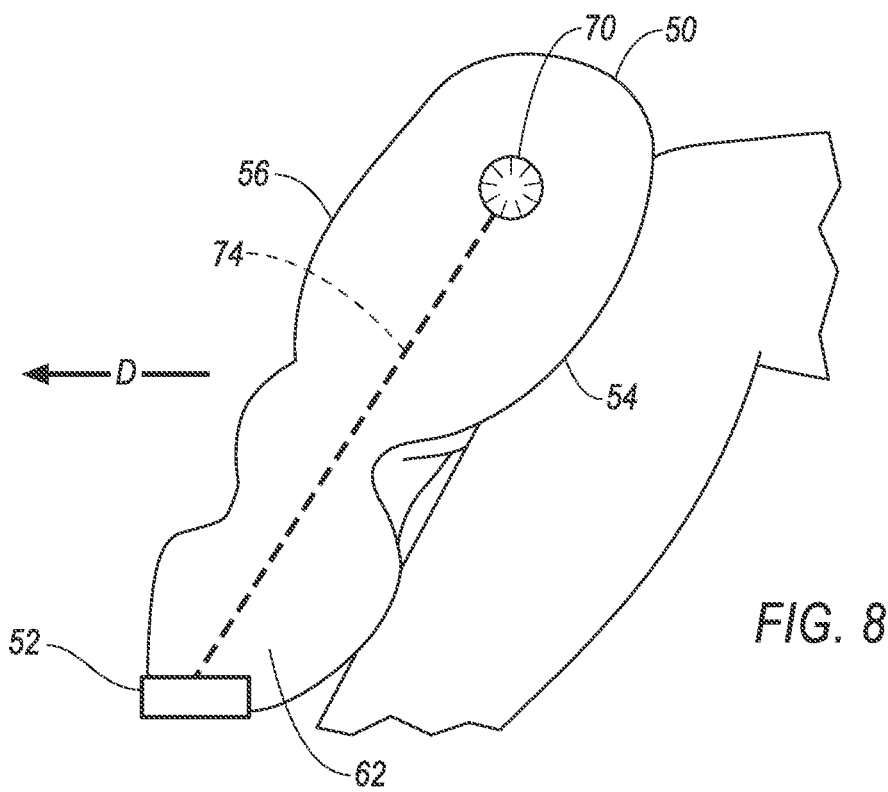
FIG. 8 is a side view of the airbag with the tether retained.

With reference to FIG. 4, the impact panel 54 has a left half 64 and a right half 66. A vertical plane P may demarcate the left half 64 from the right half 66, as shown in FIGS. 4-6. The vertical plane P may extend in vehicle-upward and vehicle-forward directions. The halves 64, 66 may be positioned relative to each other laterally, that is, in a cross-vehicle direction. The left half 64 may be disposed in the vehicle-forward direction D from a left knee of an occupant of the front passenger seat 36 when the knee airbag 50 is in the inflated position, and the right half 66 may be disposed in the vehicle-forward direction D from a right knee of an occupant of the front passenger seat 36 when the knee airbag 50 is in the inflated position.

The knee airbag 50 includes a dividing panel 68 defining a left chamber 58 and a right chamber 60. The dividing panel 68 may extend along the vertical plane P, i.e., in vehicle-upward and vehicle-forward directions. The dividing panel 68 may fluidly isolate the inflation chambers 58, 60 from each other. The inflation chambers 58, 60 may be positioned relative to each other laterally, that is, in a cross-vehicle direction. The left inflation chamber may be defined in part by the left half 64 of the impact panel 54, and the right inflation chamber may be defined in part by the right half 66 of the impact panel 54. The left chamber 58 may be disposed in the vehicle-forward direction D from a left knee of an occupant of the front passenger seat 36 when the knee airbag 50 is in the inflated position, and the right chamber 60 may be disposed in the vehicle-forward direction D from a right knee of an occupant of the front passenger seat 36 when the knee airbag 50 is in the inflated position.

The airbags 48, 50 may be formed of any suitable airbag material, for example, a woven polymer. For example, the airbags 48, 50 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane. The airbags 48, 50 may be formed of the same material and/or have the same coating or lack thereof, or the airbags 48, 50 may be formed of different materials and/or have different coatings.

The knee airbag 50 includes a left vent 70 in communication with the left chamber 58 and a right vent 72 in communication with the right chamber 60. The vents 70, 72 may lead from the respective chambers 58, 60 to the passenger cabin 32. The vents 70, 72 may be disposed on, e.g., the side panels 62. The vents 70, 72 may be, for example, open vents, one-way vents, two-way vents, or active vents. The Figures show the vents 70, 72 as active vents. When the knee airbag 50 is in the inflated position, the vents 70, 72, when open, allow inflation medium to escape at a greater rate from the respective chambers 58, 60.

With reference to FIGS. 4-8, a left tether 74 is releasably coupled to the instrument panel 42 and to the left vent 70, and a right tether 76 is releasably coupled to the instrument panel 42 and to the right vent 72. "Releasably coupled" means coupled in a manner that can be uncoupled such that the respective components may move relative to each other, as explained in more detail below with reference to the examples shown in FIGS. 9 and 10. The tethers 74, 76 extend through the respective inflation chambers 58, 60 from the airbag housing 52 to the respective vents 70, 72. For example, the tethers 74, 76 may be threaded through the respective vents 70, 72. The tethers 74, 76 may be sewn to the forward panel 56 at the airbag housing 52. The tethers 74, 76 may be clamped to the airbag housing 52. The tethers 74, 76 may have loops 78 that are held by, e.g., components of the airbag housing 52. The tethers 74, 76 may be formed of, e.g., the same material as the knee airbag 50. The tethers 74, 76 may have a straplike or cordlike shape.

Figure 9:
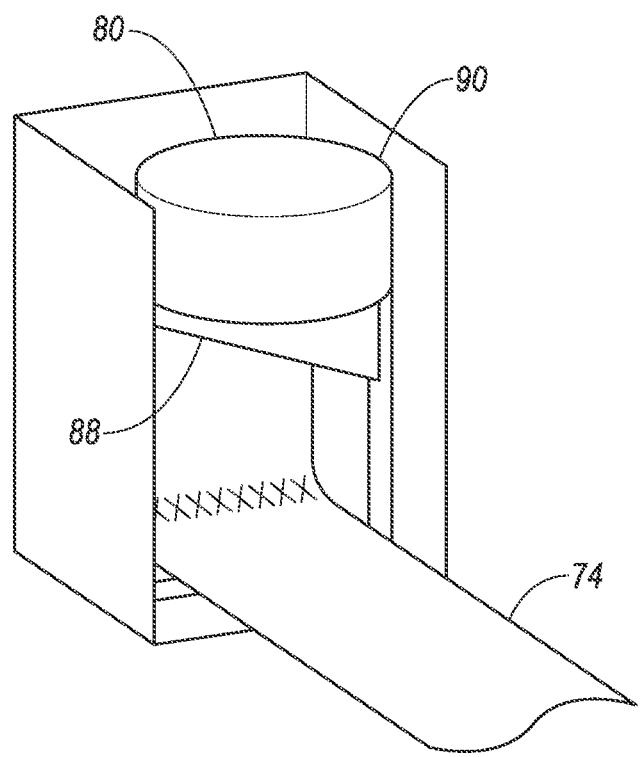
FIG. 9 is a perspective view of a cutter and the tether.
Figure 10:
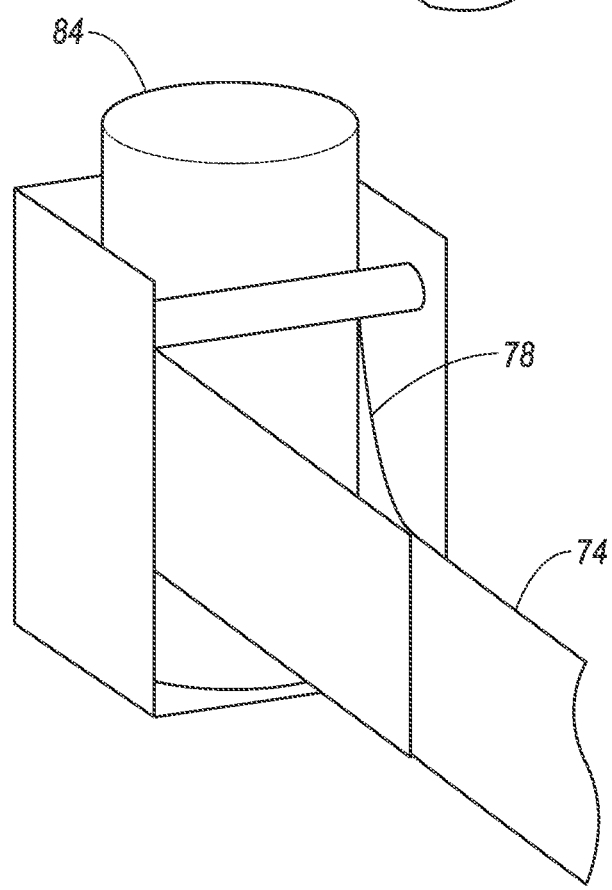
FIG. 10 is a perspective view of a release pin and the tether.
Figure 11:
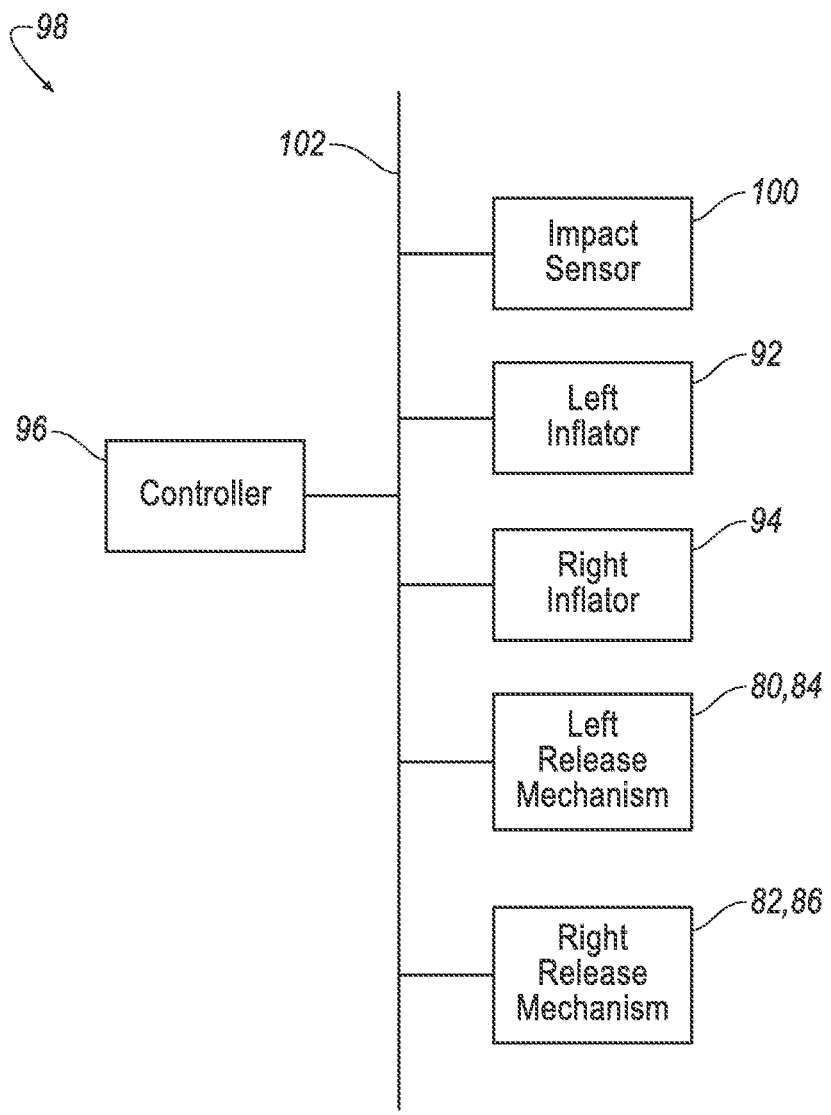
FIG. 11 is a block diagram of a control system for the airbag.

With reference to FIGS. 9-11, a left release mechanism 80, 84 and a right release mechanism 82, 86 may be fixed relative to the airbag housing 52. The left release mechanism 80, 84 may be positioned to release the left tether 74, and the right release mechanism 82, 86 may be positioned to release the right tether 76. The right release mechanism 82, 86 (not shown in FIGS. 9 and 10) may be identical to the left release mechanism 80, 84 (shown in FIGS. 9 and 10). "Release" means that the tether 74, 76 becomes uncoupled from the instrument panel 42. For example, the tethers 74, 76 may be freed, detached, severed, etc. The left release mechanism and the right release mechanism may be of any suitable type; examples of the left release mechanism 80, 84 and the right release mechanism 82, 86 are in FIGS. 9 and 10.

With reference to FIG. 9, for example, the left release mechanism 80, 84 may be a left cutter 80 positioned to sever the left tether 74, and the right release mechanism 82, 86 may be a right cutter 82 positioned to sever the right tether 76. The right cutter 82 (not shown in FIG. 9) may be identical to the left cutter 80 (shown in FIG. 9). The cutters 80, 82 may each have a sharp edge 88 directed at the respective tether 74, 76, and a mechanism such as a firing pin 90 for driving the sharp edge 88 toward the tether 74, 76. The sharp edges 88 of the cutters 80, 82 may be sharp enough to slice the tethers 74, 76.

With reference to FIG. 10, for another example, the left release mechanism 80, 84 may be a left release pin 84 coupling the left tether 74 to the airbag housing 52, and the right release mechanism 82, 86 may be a right release pin 86 coupling the right tether 76 to the airbag housing 52. The right release pin 86 (not shown in FIG. 10) may be identical to the left release pin 84 (shown in FIG. 10). The tethers 74, 76 may each have the loop extending around the respective release pin 84, 86. When the release pin 84, 86 discharges, the release pin 84, 86 jettisons out of the loop and no longer holds the respective tether 74, 76.

With reference to FIGS. 5-6 and 11, a left inflator 92 and a right inflator 94 are connected to the knee airbag 50. Specifically, the left inflator 92 is coupled to and in communication with the left chamber 58, and the right inflator 94 is coupled to and in communication with the right chamber 60. Upon receiving a signal from, e.g., a controller 96, the inflators 92, 94 may inflate the respective inflation chambers 58, 60 of the knee airbag 50 with an inflatable medium, such as a gas. The inflators 92, 94 may be, for example, pyrotechnic inflators that use a chemical reaction to drive inflation medium to the knee airbag 50. The inflators 92, 94 may be of any suitable type, for example, cold-gas inflators.

The inflators 92, 94 are dual-output inflators each capable of producing either a high output or a low output. For example, the inflators 92, 94 may produce the high output by reacting all the reactants and produce the low output by reacting a fraction of the reactants, e.g., 70%. In FIG. 6, the left inflator 92 is depicted as producing the high output, and the right inflator 94 is depicted as producing the low output.

A control system 98 may include the controller 96, the inflators 92, 94, an impact sensor 100, and the release mechanisms 80, 82, 84, 86. The control system 98 may transmit signals through a communications network 102 such as a controller area network (CAN) bus, Ethernet, Local Interconnect Network (LIN), and/or by any other wired or wireless communications network. The controller 96 may be in communication with the inflators 92, 94, the impact sensor 100, and the release mechanisms 80, 82, 84, 86 via the communications network 102.

The impact sensor 100 is adapted to detect an impact to the vehicle 30. The impact sensor 100 may be of any suitable type, for example, post-contact sensors such as linear or angular accelerometers, gyroscopes, pressure sensors, and contact switches; and pre-impact sensors such as radar, lidar, and vision-sensing systems. The vision systems may include one or more cameras, CCD image sensors, CMOS image sensors, etc. The impact sensor 100 may be located at numerous points in or on the vehicle 30.

The controller 96 may be a microprocessor-based controller. The controller 96 may include a processor, memory, etc. The memory of the controller 96 may include memory for storing instructions executable by the processor as well as for electronically storing data and/or databases. The controller 96 may be a restraint control module and may control the airbags 48, 50, seatbelts, etc. of the vehicle 30.

Figure 12:
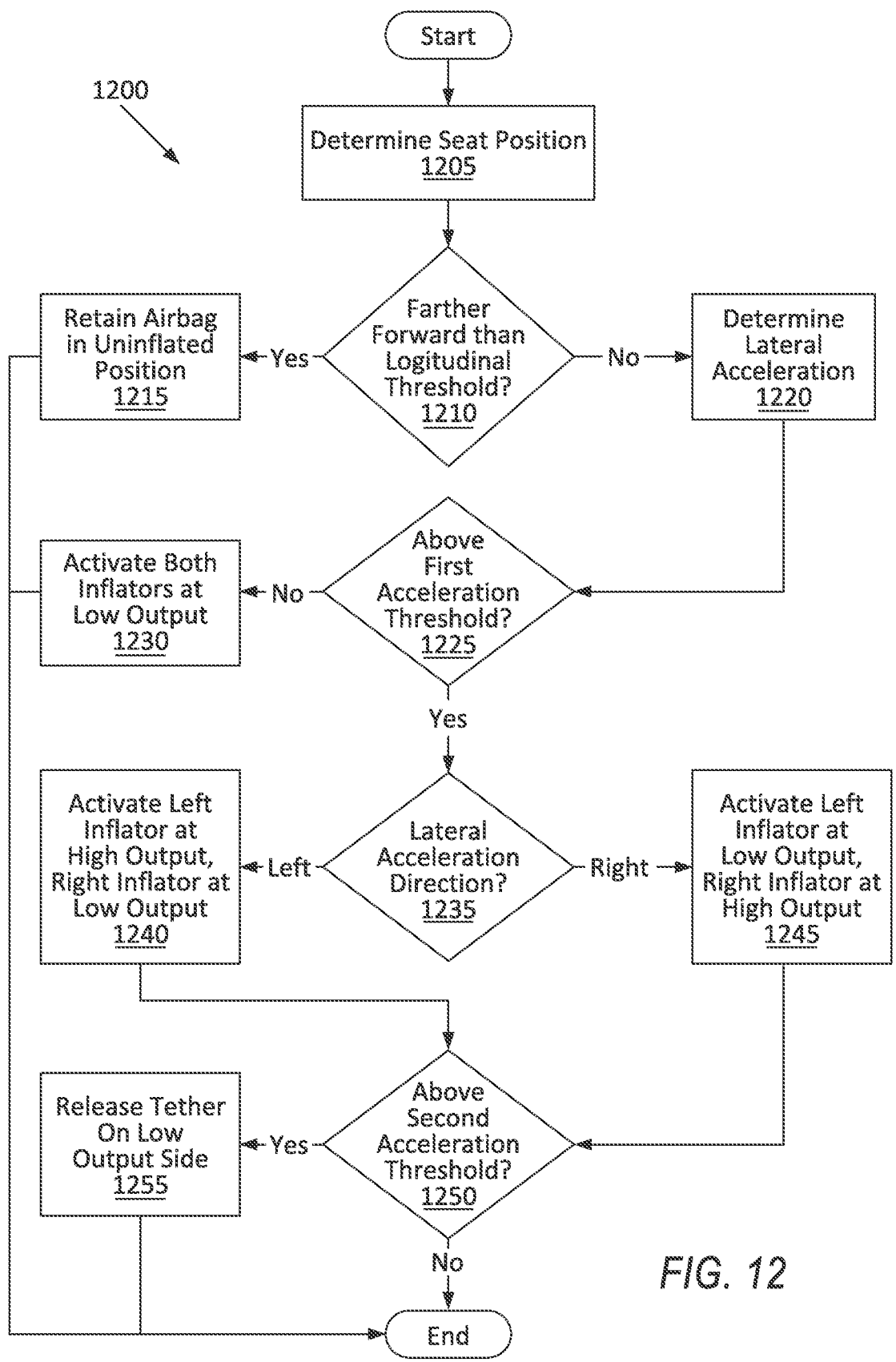
FIG. 12 is a process flow diagram of a process for deploying the airbag.

FIG. 12 is a process flow diagram illustrating an exemplary process 1200 for deploying the knee airbag 50. The memory of the controller 96 may store programming for performing the steps of the process 1200. The process 1200 begins when the controller 96 receives a signal through the communications network 102 from the impact sensor 100 indicating that the vehicle 30 has just experienced or is about to experience a frontal impact.

In a block 1205, the controller 96 receives a signal indicating a position of one of the front seats 34, 36, for example, the front passenger seat 36. The position may be, for example, a longitudinal position, i.e., a position of the front passenger seat 36 along the vehicle-forward direction D relative to the instrument panel 42, i.e., a distance from the instrument panel 42. Alternatively, the position may be a combination of multiple degrees of freedom of the front passenger seat 36, e.g., longitudinal position and height of a front of the seat bottom 38. The signal may originate from position sensors coupled to tracks of the front passenger seat 36, radar sensors aimed at the front passenger seat 36, or any other sensor suitable to determine a longitudinal position of the front passenger seat 36.

Next, in a decision block 1210, the controller 96 determines whether the front passenger seat 36 is farther forward than a longitudinal threshold. The longitudinal threshold is a position that the front passenger seat 36 may occupy, e.g., a position along the vehicle-forward direction D. The longitudinal threshold may depend on the longitudinal position; may depend on a combination of the longitudinal position and height of the front of the seat bottom 38, e.g., the longitudinal position of the longitudinal threshold is farther from the instrument panel 42 as the height of the front of the seat bottom 38 increases; or may be some other position threshold. The longitudinal threshold may be stored in the memory of the controller 96 as a scalar value if the longitudinal position is unidimensional or as a lookup table if the longitudinal position is based on multiple dimensions. If the position of the front passenger seat 36 is farther backward than the longitudinal threshold, i.e., is farther from the instrument panel 42 than the longitudinal threshold, then the process 1200 proceeds to a block 1220.

If the position of the front passenger seat 36 is farther forward than the longitudinal threshold, e.g., is closer to the instrument panel 42 than the longitudinal threshold, next, in a block 1215, the controller 96 retains the knee airbag 50 in the uninflated position. After the block 1215, the process 1200 ends.

If the position of the front passenger seat 36 is farther backward than the longitudinal threshold, i.e., is farther from the instrument panel 42 than the longitudinal threshold, in a block 1220, the controller 96 receives a signal indicating lateral acceleration of the vehicle 30. Lateral acceleration is a component of acceleration of the vehicle 30 that is in a cross-vehicle direction, that is, to the left or to the right. Acceleration to the left may be represented, e.g., by negative numbers and to the right with positive numbers. Alternatively or additionally, the controller 96 may receive a signal indicating lateral velocity of the vehicle 30.

Next, in a decision block 1225, the controller 96 determines whether an absolute value of the lateral acceleration is below a first acceleration threshold. In other words, the controller 96 determines whether the impact is a frontal impact, with the lateral acceleration below the first acceleration threshold, or an oblique frontal impact, with the lateral acceleration above the first acceleration threshold. The first acceleration threshold may be chosen to be a value above which the passenger airbag 48 may cause a torque on a head of the occupant that is above a value known to cause injury or above a value specified by, e.g., government regulations. If the absolute value of the lateral acceleration is above the first acceleration threshold, the process 1200 proceeds to a decision block 1235. Alternatively, the controller 96 may determine whether the lateral velocity or a value from a formula of the lateral acceleration and lateral velocity exceeds a velocity threshold or combined threshold, respectively. The velocity or combined threshold may be chosen based on head torque, government regulations, etc., as described for the first acceleration threshold.

If the absolute value of the lateral acceleration is below the acceleration threshold (or, alternatively, the lateral velocity or formula value does not exceed the velocity or combined threshold), next, in a block 1230, the controller 96 activates both inflators 92, 94 at the low output. The controller 96 transmits instructions via the communications network 102 to both inflators 92, 94 to inflate at the low output. After the block 1230, the process 1200 ends.

If the absolute value of the lateral acceleration is above the acceleration threshold (or, alternatively the lateral velocity or formula value exceeds the velocity or combined threshold), in a decision block 1235, the controller 96 determines a direction of the lateral acceleration. If the lateral acceleration is negative, then the impact is a left oblique impact, that is, an impact occurring from the left side of the vehicle 30. If the lateral acceleration is positive, then the impact is a right oblique impact, that is, an impact occurring from the right side of the vehicle 30. (The convention may be reversed.) If the impact is a left oblique impact, then the process 1200 proceeds to a block 1240; if the impact is a right oblique impact, then the process 1200 proceeds to a block 1245.

To summarize the blocks 1240 and 1245 below, the controller 96 selectively activates each inflator to one of the high output and the low output based on the impact angle, e.g., whether the impact is a left or right oblique impact. For the purposes of this disclosure, "impact angle" is defined as an angle from a longitudinal centerline of the vehicle 30 of a net force from an impact with an object outside the vehicle 30. A left oblique impact is an impact at an angle offset from the longitudinal centerline to the left, and a right oblique impact is an impact at an angle offset from the longitudinal centerline to the right. Specifically, the controller 96 may activate the inflator 92, 94 closer to the side of impact to the high output and activate the inflator 92, 94 farther from the side of impact to the low output.

If the impact is a left oblique impact, after the decision block 1235, in a block 1240, the controller 96 activates the left inflator 92 to the high output and activates the right inflator 94 to the low output. The controller 96 transmits an instruction via the communications network 102 to the left inflator 92 to inflate at the high output and to the right inflator 94 to inflate at the low output.

If the impact is a right oblique impact, after the decision block 1245, in a block 1245, the controller 96 activates the right inflator 94 to the high output and the left inflator 92 to the low output. The controller 96 transmits an instruction via the communications network 102 to the right inflator 94 to inflate at the high output and to the left inflator 92 to inflate at the low output.

After either the block 1240 or the block 1245, in a decision block 1250, the controller 96 determines whether the absolute value of the lateral acceleration is below a second acceleration threshold. The second acceleration threshold may be chosen to be a value above which the passenger airbag 48 may cause a torque on a head of the occupant that is above a value known to cause injury or above a value specified by, e.g., government regulations, and for which additional force is needed to get a value of torque within an acceptable level. The second acceleration threshold is greater than the first acceleration threshold. If the absolute value of the lateral acceleration is below the second acceleration threshold, the process 1200 ends. Alternatively, the controller 96 may determine whether the lateral velocity or a value from a formula of the lateral acceleration and lateral velocity exceeds a velocity threshold or combined threshold, respectively. The velocity or combined threshold may be chosen based on head torque, government regulations, etc., as described for the second acceleration threshold.

If the absolute value of the lateral acceleration is above the acceleration threshold (or, alternatively the lateral velocity or formula value exceeds the velocity or combined threshold), next, in a block 1255, the controller 96 releases the tether 74, 76 in the inflation chamber 58, 60 that received the low output from the corresponding inflator 92, 94, and the controller 96 retains the tether 74, 76 in the other inflation chamber 58, 60. Thus, in response to a left oblique impact, the controller 96 releases the right tether 76. For example, the controller 96 may transmit an instruction to the right cutter 82 to sever the right tether 76. For another example, the controller 96 may transmit an instruction to the right release pin 86 to discharge and free the right tether 76. In response to a right oblique impact, the controller 96 releases the left tether 74. For example, the controller 96 may transmit an instruction to the left cutter 80 to sever the left tether 74. For another example, the controller 96 may transmit an instruction to the left release pin 84 to discharge and free the left tether 74. After the block 1255, the process 1200 ends.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
   an instrument panel having an exterior panel directed downward;
   an airbag having an uninflated position behind the exterior panel and having a left chamber and a right chamber;
   a left inflator coupled to the left chamber;
   a right inflator coupled to the right chamber; and
   a controller programmed to selectively activate each inflator to one of a high output and a low output based on an impact angle, and to activate the left inflator to the high output in response to a left oblique impact and to activate the right inflator to the high output in response to a right oblique impact.

2. The restraint system of claim 1, wherein the controller is programmed to activate the right inflator to the low output in response to a left oblique impact and to activate the left inflator to the low output in response to a right oblique impact.

3. The restraint system of claim 1, wherein the controller is programmed to receive a signal indicating lateral acceleration of a vehicle including the restraint system, and to activate both inflators at a low output in response to determining that an absolute value of the lateral acceleration is below an acceleration threshold.

4. The restraint system of claim 3, further comprising a left tether coupled to the left chamber and releasably coupled to the instrument panel, a right tether coupled to the right chamber and releasably coupled to the instrument panel, wherein the acceleration threshold is a first acceleration threshold, and the controller is programmed to release the right tether in response to a left oblique impact upon determining that the lateral acceleration is above a second acceleration threshold, and to release the left tether in response to a right oblique impact upon determining that the lateral acceleration is above the second acceleration threshold.

5. The restraint system of claim 4, wherein the second acceleration threshold is greater than the first acceleration threshold.

6. The restraint system of claim 1, wherein the controller is programmed to receive a signal indicating a position of a seat, and to retain the airbag in an uninflated position in response to determining that the seat is farther forward than a longitudinal threshold.

7. The restraint system of claim 1, further comprising a left vent in communication with the left chamber, a right vent in communication with the right chamber, a left tether coupled to the left vent and releasably coupled to the instrument panel, and a right tether coupled to the right vent and releasably coupled to the instrument panel.

8. The restraint system of claim 7, wherein the vents are active vents.

9. The restraint system of claim 8, further comprising an airbag housing coupled to the instrument panel, wherein the airbag in the uninflated position is disposed in the airbag housing.

10. The restraint system of claim 9, further comprising a left release mechanism and a right release mechanism fixed relative to the airbag housing and in communication with the controller, wherein the left release mechanism is positioned to release the left tether, and the right release mechanism is positioned to release the right tether.

11. The restraint system of claim 10, wherein the left release mechanism is a left cutter positioned to sever the left tether, and the right release mechanism is a right cutter positioned to sever the right tether.

12. The restraint system of claim 10, wherein the left release mechanism is a left release pin coupling the left tether to the airbag housing, and the right release mechanism is a right release pin coupling the right tether to the airbag housing.

13. The restraint system of claim 1, further comprising an impact sensor in communication with the controller.

14. The restraint system of claim 1, wherein the airbag includes a dividing panel defining the left chamber and the right chamber.

15. The restraint system of claim 1, wherein the airbag is disposed to inflate at least partially below the instrument panel.

16. The restraint system of claim 1, wherein the airbag is positioned to contact knees of a 50th percentile occupant of a seat facing the instrument panel when the airbag is inflated.

17. The restraint system of claim 1, wherein the airbag is a first airbag, the restraint system further comprising a second airbag coupled to the instrument panel above the first airbag.

18. A restraint system comprising:
   an instrument panel having an exterior panel directed downward;
   an airbag having an uninflated position behind the exterior panel and having a left chamber and a right chamber;
   a left inflator coupled to the left chamber;
   a right inflator coupled to the right chamber; and
   a controller programmed to selectively activate each inflator to one of a high output and a low output based on an impact angle, to receive a signal indicating lateral acceleration of a vehicle including the restraint system, and to activate both inflators at a low output in response to determining that an absolute value of the lateral acceleration is below an acceleration threshold.

19. The restraint system of claim 18, further comprising a left tether coupled to the left chamber and releasably coupled to the instrument panel, a right tether coupled to the right chamber and releasably coupled to the instrument panel, wherein the acceleration threshold is a first acceleration threshold, and the controller is programmed to release the right tether in response to a left oblique impact upon determining that the lateral acceleration is above a second acceleration threshold, and to release the left tether in response to a right oblique impact upon determining that the lateral acceleration is above the second acceleration threshold.

20. The restraint system of claim 19, wherein the second acceleration threshold is greater than the first acceleration threshold.

\* \* \* \* \*